United States Patent [19]

Müller

[11] Patent Number: 5,416,266
[45] Date of Patent: May 16, 1995

[54] ENCASED GAS-INSULATED HIGH-TENSION INSTALLATION AND AN ASSEMBLY OF SUCH AN INSTALLATION

[75] Inventor: Thomas Müller, Buchs, Switzerland

[73] Assignee: Sprecher Energie AG, Oberentfelden, Switzerland

[21] Appl. No.: 149,358

[22] Filed: Nov. 9, 1993

[30] Foreign Application Priority Data

Nov. 13, 1992 [EP] European Pat. Off. ............ 92119421

[51] Int. Cl.⁶ .................................... H02G 15/24
[52] U.S. Cl. ..................... 174/21 C; 174/21 CA; 174/22 C; 174/28
[58] Field of Search ............ 174/21 C, 21 R, 21 CA, 174/22 C, 16.2, 99 B, 28

[56] References Cited

U.S. PATENT DOCUMENTS

| | | |
|---|---|---|
| 3,809,795 | 5/1974 | Olsen et al. |
| 4,024,339 | 5/1977 | Meyer et al. |
| 4,338,483 | 7/1982 | Euvrard et al. ................ 174/28 |
| 4,477,691 | 10/1984 | Giboulet et al. .............. 174/22 C |
| 4,730,085 | 3/1988 | Hama et al. ................... 174/14 R |
| 4,786,761 | 11/1988 | Hama et al. ................... 174/22 C |

FOREIGN PATENT DOCUMENTS

| | | | |
|---|---|---|---|
| 2407586 | 6/1979 | France | 174/21 C |
| 3546011 | 10/1986 | Germany |  |

OTHER PUBLICATIONS

Research Disclosure No. 245, Sep. 1984. Hampshire, Seite 456 "Insulating Screw Joint".
Metallgekapselte, SF6–isolierte Hochspannungsanlagen Typ B 212 Sprecher+Schuh AG.

*Primary Examiner*—Morris H. Nimmo
*Attorney, Agent, or Firm*—Keck, Mahin & Cate

[57] ABSTRACT

The end flange (16) of the first encasing part (10) of the gas-insulated high-tension installation is an outer flange and includes through bores (34). A first securing ring (18) is provided on the end-face side of the end flange (16). The securing ring holds a first insulator (28). The first securing ring (18) includes through bores (36) which are in alignment with the through bores (34) and which have a stepped configuration. The step forms, in each instance, a counterabutment (42), which cooperates with the abutment (44) of the respective threaded bolt (38). To secure the first securing ring (18) on the first encasing part (10), the abutment (44) rests on the counterabutment (42) and, on the other side, the threaded bolt (38) is supported by the nut (48) on the end flange (16). To secure the assembly (52) on the second securing ring (20) secured to the second encasing part (12), the nut (48) is released, the threaded bolt (38) is screwed, by its thread (46), into the threaded bore (36') of the second securing ring (20) and then the nut (48) is tightened again.

10 Claims, 3 Drawing Sheets

ENCASED GAS-INSULATED HIGH-TENSION INSTALLATION AND AN ASSEMBLY OF SUCH AN INSTALLATION

FIELD OF THE INVENTION

The invention relates to a gas-insulated high-tension installation and to an assembly of such a gas-insulated high-tension installation.

BACKGROUND OF THE INVENTION

A high-tension installation and an assembly of this type are known from U.S. Pat. No. 4,024,339. A first tube-like encasing part includes an end flange, designed as an outer flange, with through bores disposed on a part circle coaxial with the axis of the first encasing part. A second encasing part with a similarly designed end flange is disposed in alignment with the first encasing part, through bolts passing through from the second encasing part freely through the through bores in the end flanges, the through bolts being supported by nuts at the end flange of the first encasing part. Seen in the radial direction, a securing ring is disposed within the through bolts between the end flanges of the first and second encasing parts, which securing ring is secured by means of cap screws to the end flange of the first encasing part. The internal envelope surface of this securing ring is, seen from the first encasing part, designed to be conically tapering, in order to retain an insulator and to press the insulator onto a ring-like sealing element between the insulator and the end flange of the first encasing part. The insulator carries, centrally, a tube-like current conductor and the encasing spaces defined by the first and second encasing parts are partitioned off from one another.

With the second encasing part removed from the first encasing part, the securing ring holds the insulator in sealed connection firmly on the first encasing part, forming an assembly with the first encasing part which is ready for dispatch and is suitable for local mounting. In this case, the insulating gas in the encasing space of this assembly is usually only slightly above ambient pressure for transport and mounting. When mounting the high-tension installation has been completed, the insulating gas is placed under the pressure required for the pertinent voltage.

In the case of this known high-tension installation, the bolts connecting the first and second encasing part to one another are outwardly displaced with respect to the securing ring. This involves appropriately large dimensions of the end flanges, as well as a large number of bolts of high strength. Due to the required large diameters of the end flanges, the space required by the high-tension installation is also large.

Further, in the case of a high-tension installation as is known from Sprecher and Schuh (Catalog No. 47 B1) "Metal-encased, $SF_6$-insulated high-tension installations, type B 212" (1977), the securing rings are screwed by means of through bolts onto the corresponding end flanges. In this case, the part circle of these through bolts is the same as the part circle of those through bores in the end flanges and in the securing rings which are penetrated by the through bolts stressing the encasing parts relative to one another. The through bolts which hold the securing rings on the corresponding end flanges are only required until the two encasing parts are firmly screwed to one another. This is necessary for guaranteeing gas sealing of the assembly during transport as an assembly until the mounting of the high-tension installation and for holding the active parts carried by the insulator. For a high-tension installation of this type, the through bolts fastening the securing rings to the end flanges require considerable space in addition to the through bolts which are required to secure the encasing parts to one another. In this case also, the end flanges are required to be large.

Furthermore, DE-A-2,157,101, which corresponds to U.S. Pat. No. 3,809,795, discloses a high-tension installation in which the insulator is disposed on a securing ring. The latter includes blind bores with threads, on both sides, into which cap screws penetrating the end flanges of the corresponding encasing parts are inserted. Thus, the encasing parts are screwed exclusively to the securing ring. This structure also requires securing rings of considerable axial thickness.

SUMMARY OF THE INVENTION

It is an object of the present invention to provide a gas-insulated high-tension installation and an assembly of a gas-insulated high-tension installation in such a manner that the space requirement of its end flanges and thus the dimensions of the entire installation or assembly are reduced.

The same screws are used for securing the securing ring on the end flange of the first encasing part and for securing the first and second encasing parts to one another. Thus, a minimum number of bolts is required and consequently the dimensions of the end flanges can be minimized. It is not necessary to provide any bolts for exclusively holding the securing ring on the end flange of the first encasing part.

Since, on account of the combinability of all the encasing parts, all the end flanges of a high-tension installation are usually designed similarly, the present invention provides for a reduction of the dimensions of all the end flanges. This in turn means that the dimensions of the entire high-tension installation can be reduced. The use of bolts with an abutment between the two threads requires comparatively little expenditure.

The apertures of the securing ring which are penetrated by the bolts are preferably designed in a stepwise manner. This avoids a situation in which, on the second encasing part, recesses are present to receive that part of the bolt on which the abutment is formed. In a particularly preferred embodiment, when the second encasing part has been separated from the first encasing part, the free end region of the bolt is situated in the interior of the aperture. Damage to the bolt and especially to its thread in this region during transport and in the course of mounting is thereby prevented.

Further preferred embodiments of the present invention are described below.

BRIEF DESCRIPTION OF THE DRAWINGS

The present invention is now explained in greater detail with reference to two illustrative embodiments shown in the drawings.

DETAIL DESCRIPTION OF THE PREFERRED EMBODIMENTS

Figure 1:
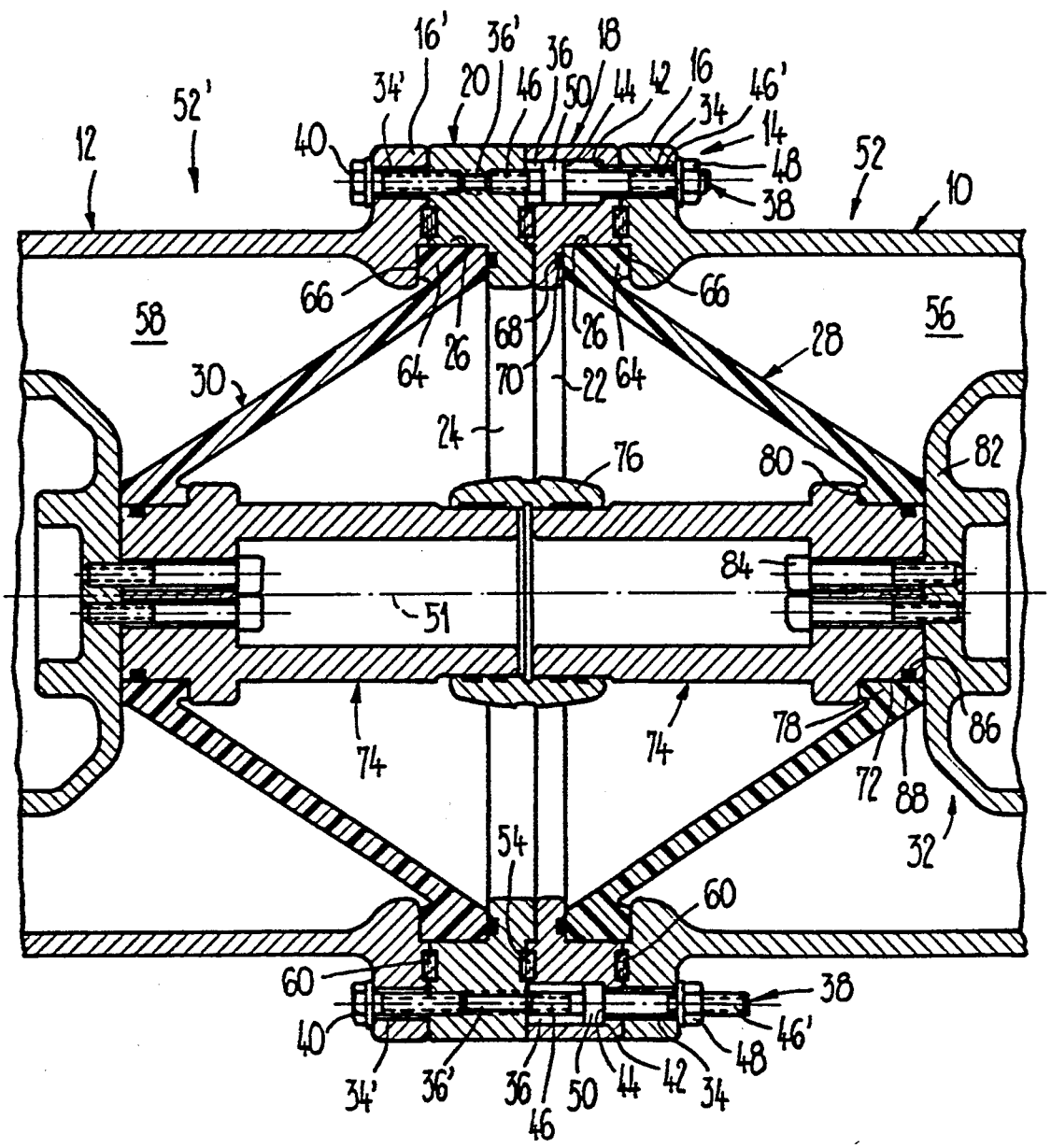
FIG. 1 shows, in longitudinal cross section, a part of a busbar of a high-tension installation in the region of connection of encasing parts during mounting.
Figure 2:
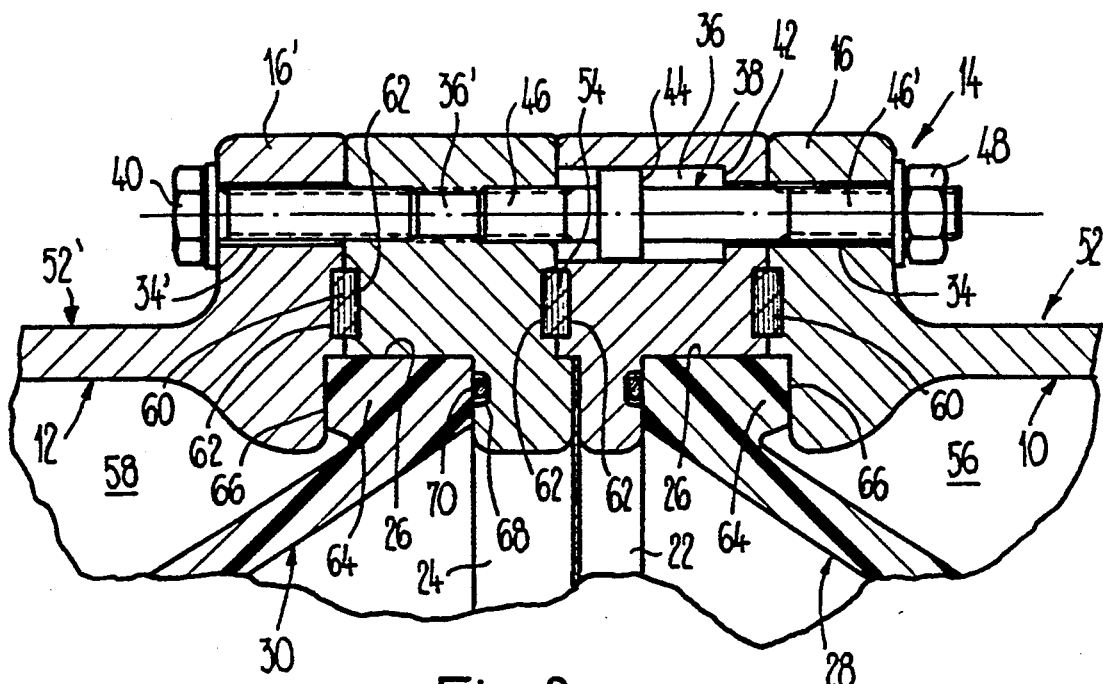
FIG. 2 is an enlarged view of a detail of FIG. 1, showing the connection region of the encasing parts secured to one another.

FIGS. 1 and 2 show a metallic first encasing part 10 and a metallic second encasing part 12 in the region of screw connections 14, by means of which the encasing parts are secured to one another. The two tube-like, mutually aligned encasing parts 10, 12 include at their mutually facing ends, end flanges 16, 16', which are designed as outer flanges. Between the encasing parts, a first securing ring 18 and a second securing ring 20 are disposed which have substantially the same dimensions in a radial direction as the end flanges 16, 16'. The first and second securing rings 18, 20, which are also made of metal, have at their mutually facing end regions, circumferential retaining beadings 22, 24, which project in an inward direction with respect to internal envelope surfaces 26 formed on the securing rings 18, 20, in order to clamp cone-shaped insulators 28, 30 firmly between the beadings 22, 24 and the corresponding encasing parts 10, 12. The insulators 28, 30 support the current-carrying parts 32 with respect to the casing in an electrically insulated manner.

The end flanges 16, 16' and the two securing rings 18, 20 have through bores 34, 34', 36, 36', which extend in an axial direction and which are in alignment with one another and are disposed on a unitary part circle. The through bores 34 in the end flange 16 and the through bores 34' in the end flange 16' can be freely penetrated by threaded bolts 38 or cap screws 40. The through bores 36 in the first securing ring 18 are, seen from the first encasing part 10, designed in a step-like widening manner, the step-like widened portion forming a counterabutment 42, which is intended to cooperate with an abutment 44 on the threaded bolt 38. The through bores 36' in the second securing ring 20 are threaded bores and cooperate both with the thread of the cap screws 40 and also with the thread 46 on the side of threaded bolts 38.

In the end region remote from the thread 46, the threaded bolts 38 include a further thread 46' which cooperates with a nut 48, which is supported via a washer on the end flange 16 of the first encasing part 10 at the side remote from the first securing ring 18. Between the two threads 46, 46' the threaded bolt 38 is provided with an encircling beading 50, the end face of which facing the first encasing part 10 forms the abutment 44. The counterabutment 42 and abutment 44 lie in planes extending at right angles to the longitudinal axis 51 of the encasing parts 10, 12.

As is shown in FIG. 1 and FIG. 2, the second securing ring 20 is stressed by means of the threaded bolts 38 against the end flange 16. In this case, the first securing ring 18 is held in firmly clamped manner between the end flange 16 and the second securing ring 20. The threaded bolts 38 are screwed in by their threads 46 into the through bores 36' and are supported via the nuts 48 on the end flange 16. The abutment 44 is raised from the counterabutment 42. The second encasing part 12 is secured to the second securing ring 20 by means of cap screws 40 threaded into the through bores 36'.

Figure 3:
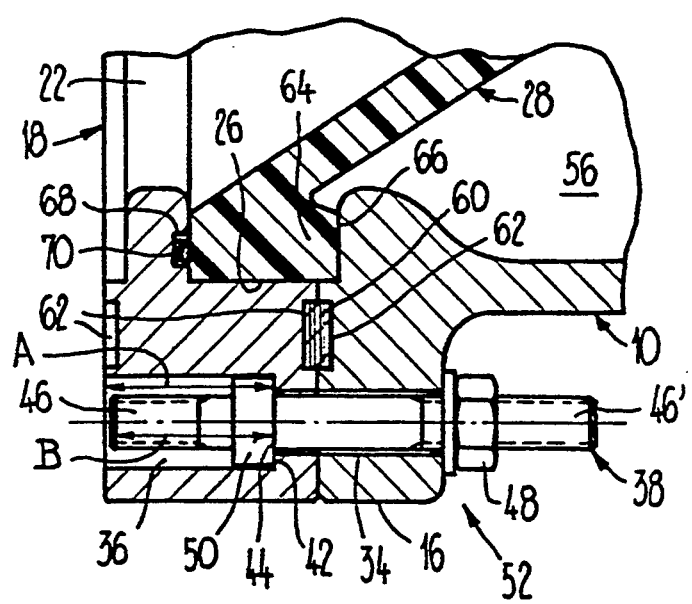
FIG. 3 is an enlarged view of another detail of FIG. 1, showing part of an assembly of the high-tension installation.

When the first encasing part 10 together with the first securing ring 18 is separated as assembly 52 (see FIG. 3) from the second encasing part 12 and the second securing ring 20, the first securing ring 18 is secured by means of threaded bolts 38 to the end flange 16 of the first encasing part 10. Threaded bolts 38 lie with their abutments 44 against the counterabutments 42 of the first securing ring 18 and are supported via the nuts 48 on the end flange 16. The partial depth A of the through bores 36, measured from the end remote from the first encasing part 12 to the counterabutment 42, is in this case at least as great as the partial length B of the threaded bolt 38, measured from its end remote from the first encasing part 10 to the abutment 44 (FIG. 3). As a result, the threaded bolts 38 are entirely inserted into the through bores 36 in this region, so that in particular the threads 46 are protected against damage in the course of transport of the assembly 52, as well as in the course of mounting of the high-tension installation. Of course, the axial dimension of the threads 46' is sufficiently large to be able to perform their function in connection with the assembly 52 and also in connection with the mounted high-tension installation.

In the course of mounting the high-tension installation, the assembly 52 is aligned with the second securing ring 20 forming, together with the second encasing part 12, a further assembly 52', and is brought into abutment on the end face with the insertion of a sealing ring 54 (see FIG. 1 at the bottom). Then, the nut 48 of a first threaded bolt 38 is released, and this threaded bolt 38 is threaded, by its thread 46, into the corresponding through bore 36' of the second securing ring 20. In this case, the abutment 44 lifts off from the counterabutment 42. However, the remaining threaded bolts 48 continue to hold the first securing ring 18 firmly on the end flange 16. After this, the previously released nut 48 is tightened again. This process is now repeated until all the threaded bolts 38 stress the second securing ring 20 and the end flange 16 against one another. If demounting is necessary, in the reverse sequence, one threaded bolt 38 after the other is, after the release of the corresponding nut 38, removed from the through bore 36' and then brought into contact between the pertinent counterabutment 42 and its abutment 44, by tightening the nut 48. In this case, the first encasing space 56 bounded by the first encasing part 10 and first insulator 28, remains at all times tightly sealed. The same applies to the second encasing space 58 bounded by the second encasing part 12 and second insulator 30.

In order to seal off the encasing spaces 56, 58 from the exterior, sealing rings 60 corresponding to the sealing ring 54 are inserted between the end flanges 16, 16' and the first and respectively second securing rings 18, 20. Since the sealing rings 54, 60 are inserted into grooves 62 in the securing rings 18, 20 and end flanges 16, 16', and the securing rings 18, 20 rest on one another and on end flanges 16, 16' at the end face, the sealing rings 54, 60 are under optimal pressure and thus guarantee a reliable sealing.

Encircling retaining rings 64 are formed on the insulators 28, 30, which abut, for radial fixing, on the envelope surfaces 26 and cooperate at their end faces on the one hand with a bearing surface 66 on the first and respectively second encasing parts 10, 12 and on the other hand with the retaining beadings 22, 24 of the securing rings 18, 20. On the end face facing the respective insulator 28, 30, the retaining beadings 22, 24 include, in each instance, a groove 68, into which a further sealing ring 70 is inserted, in order to seal off the encasing spaces 56, 58 in the axial direction also.

The cone-shaped insulators 28, 30 include a central cylindrical aperture 72, which is penetrated in each instance by a connecting conductor 74 coaxial with the axis 51. When the high-tension installation is assembled, the connecting conductors 74 are electrically connected to one another by means of a sleeve 76. At the aperture 72, the insulators 28, 30 each have internal retaining rings 78, on an inner face of which a circumferential bearing surface 80 of the connecting conductors 74 rests and on an outer side, coupling bodies 82 rest. The connecting conductors 74 are secured to one another with the pertinent coupling bodies 82 by means of screws 84 extending in the axial direction and are thus fixed via the insulators 28, 30 and the securing rings 18, 20 to the first and respectively second encasing parts 10, 12. In the region of the apertures 72, the connecting conductors 74 include in each instance a circumferential groove 86, into which a sealing ring 88 is inserted, to prevent the passage of insulating gas between the insulators 28, 30 and the connecting conductors 74.

The cone-shaped insulators 28, 30 face away from one another, i.e. they taper in a direction towards the interior of the corresponding encasing spaces 56, 58. The free ends of the connecting conductors 74 lie approximately in the plane of the axial end of the securing rings 18, 20 which is remote from the corresponding encasing part 10, 12. The free ends are thus protected against mechanical damage in the course of dispatch and in the course of mounting the assemblies 52, 52'. In the course of mounting, the connection of the connecting conductors 74 can be made in a simple manner. The sleeve 76 can be fitted onto one of the connecting conductors 74 and then the sleeve 76 can be joined to the other connecting conductor 74 in an axial direction. After mounting, the space between the two insulators 28, 30 just needs to be evacuated and then filled with insulating gas to the required pressure, while the other encasing spaces 56, 58 already filled with insulating gas to a specified pressure in the factory, just need also to be filled with further insulating gas, until the required nominal pressure has been reached. In another embodiment, one of the insulators 28, 30 may not be designed as a compartment insulator and may have an aperture between the corresponding encasing space 56, 58 and the space between the two insulators 28, 30. In this case, it is not necessary to provide a separate gas connection for the gas space between the two insulators 28, 30. It is however necessary after mounting of the high-tension installation, to evacuate the corresponding encasing space 56, 58 and to fill the same with insulating gas.

Figure 4:
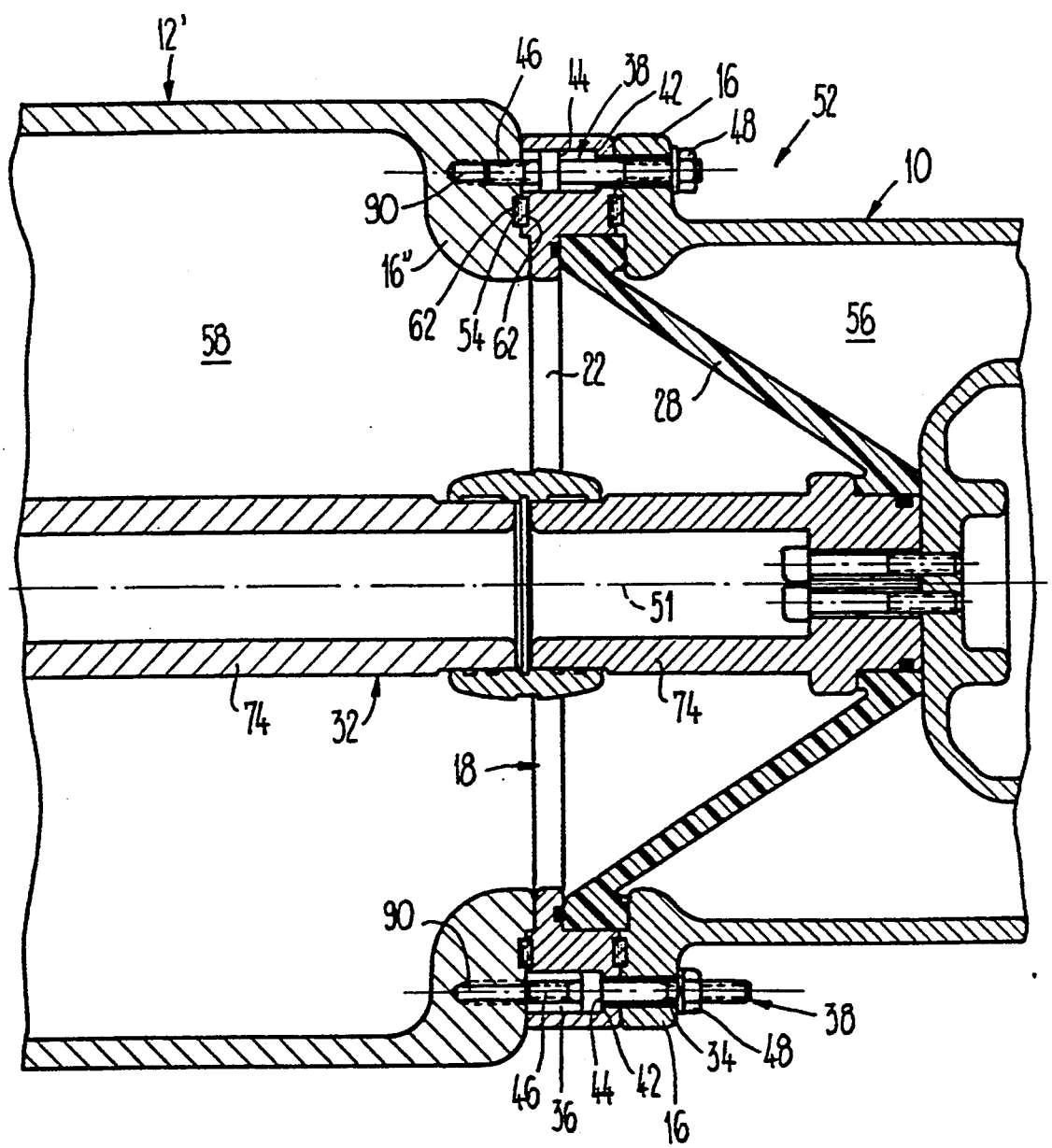
FIG. 4 is a longitudinal cross section of a part of the high-tension installation, in the connection region of an encasing part associated with the busbar with another encasing part during mounting.

In that part of the high-tension installation which is shown in FIG. 4, the assembly 52 is designed in precisely the same manner as the assembly 52 shown in FIGS. 1 to 3. Reference is made to the corresponding description hereinabove and in FIG. 4 the pertinent reference symbols have been entered only to the extent that this is necessary for understanding. The second encasing part 12' which is larger in diameter than the first encasing part 10, has an end flange 16", which is designed as an internal flange. Flange 16" includes blind threaded bores 90 which are in alignment with the through bores 34 in the end flange 16 of the first encasing part 10 and through bores 36 in the first securing ring 18. In other respects, the design of the end flange 16" at the side facing the assembly 52 corresponds to the corresponding region of the second securing ring 20 according to FIGS. 1 and 2.

As shown in FIG. 4, in the case of the assembly 52 ready for dispatch, the first securing ring 18 is held on the end flange 16 by means of the threaded bolts 38. The threaded bolts 38 penetrating the through bores 34, 36 rest by their abutments 44 against the counterabutments 42 of the first securing ring 18 and are supported on the end flange 16 at the other side by the nuts 48. In this case, the part of the threaded bolts 38 which is situated on the securing-ring side is entirely sunk in the through bores 36.

A connecting conductor 74 is likewise centrally disposed in the interior of the second encasing part 12', which conductor is supported on the second encasing part 12' via generally known insulating means which are not shown in FIG. 4. In the course of mounting, a sleeve 76 is again fitted onto the end region of one of the connecting conductors 74 and this sleeve is joined in the axial direction to the other connecting conductor 74. To secure the encasing parts 10, 12' to one another, the nut 48 is then released, the threaded bolt 38 is turned in by its thread 46 into the pertinent threaded aperture 90 and the nut 48 is then tightened again, as is shown in FIG. 4 at the top. In this case, the abutment 44 again moves away from the counterabutment 42. Of course, a sealing ring 54 is again inserted into the corresponding grooves 62 in the end flange 16" and first securing ring 18, in order to prevent the subsequent escape of insulating gas. If the insulator 28 of the assembly 52 is again designed as a compartment insulator, the encasing space 56 can be filled with insulating gas in the factory. Since in the example shown, no insulator associated with the second encasing part 12' is provided in the region of the end flange 16", after the mounting of the high-tension installation the corresponding encasing space 58 has to be evacuated and filled with insulating gas.

In the embodiment according to FIG. 4, only threaded bolts 38 are required to secure both the first securing ring 18 to the first encasing part 10 and also to secure the encasing parts 10 and 12' to one another.

The present invention may also be used in high-tension installations in which the casings are assembled in several phases.

While the invention has been described with respect to certain embodiments thereof, variations and modifications may be made without departing from the spirit and scope of the invention.

What is claimed is:

1. A gas-insulated high-tension installation comprising:
    a first encasing part (10) having an end flange (16), designed as an outer flange, with through bores (34),
    a second encasing part (12, 12'),
    a securing ring (18), disposed between the second encasing part (12, 12') and the end flange (16) for holding an insulator (28), and
    screw connections (14) comprising bolts and nuts for securing the securing ring (18) to the end flange (16) and for securing the first and second encasing parts (10, 12, 12') to one another,
    wherein said bolts (38) connected to the second encasing part (12, 12') freely penetrate the securing ring (18) and the through bores (34) of the end flange (16) and are supported on the end flange (16) by means of nuts (48), wherein the bolts (38) are threaded bolts with an abutment (44) disposed between its two threads (46, 46'), and wherein a counterabutment (42) intended to cooperate with the abutment (44) is provided on the securing ring (18) on the side remote from the end flange (16), for securing the securing ring (18) to the end flange (16) when the second encasing part (12, 12') has been separated from the first encasing part (10).

2. A gas insulated high-tension installation as claimed in claim 1, wherein apertures (36) of the securing ring (18) which are penetrated by the bolts (38), seen from the direction of the end flange (16), have a step-like widening and the respective step forms the counterabutment (42).

3. A gas insulated high-tension installation as claimed in claim 2, wherein a partial depth of the aperture (36), measured from its end remote from the end flange (16) to the counterabutment (42), corresponds at least to a partial length of the bolt (38) from its abutment (44) to its end remote from the end flange (16).

4. A gas insulated high-tension installation as claimed in claim 1, wherein the second encasing part (12') comprises an end flange (16"), designed as an internal flange, with blind threaded bores (90) into which the bolts (38) are threaded.

5. A gas insulated high-tension installation as claimed in claim 1, wherein a second securing ring (20) for holding a second insulator (30) is disposed on the second encasing part (12), said second securing ring being provided with threaded bores (36'), into which the bolts (38) are threaded.

6. A gas insulated high-tension installation as claimed in claim 1, wherein the bolts (38) comprise, between threads (46, 46'), an encircling beading (50), an axial end face of which forms abutment (44).

7. An assembly (52) of a gas-insulated high-tension installation, comprising:
 a first encasing part (10), having an end flange (16), designed as an outer flange, with through bores (34),
 a securing ring (18) secured by bolts (38) to the end flange (16) for holding an insulator (28) wherein the bolts (38) penetrate the securing ring (18) and the end flange (16) and are supported on counterabutments (42) provided on the securing ring (16) on the side remote from the end flange (16) and by means of nuts (48) on the end flange (16), wherein the bolts (38) are threaded bolts with an abutment (44) disposed between their two threads (46 46') and are supported by their abutments (44) on the counterabutments (42).

8. An assembly as claimed in claim 7 wherein apertures (36) of the securing ring (18) which are penetrated by the bolts (38), seen from the direction of the end flange (16), have a step-like widening and the respective step forms the counterabutment (42).

9. An assembly as claimed in claim 8, wherein a partial depth of the aperture (36), measured from its end remote from the end flange (16) to the counterabutment (42), corresponds at least to a partial length of the bolt (38) from its abutment (44) to its end remote from the end flange (16).

10. An assembly as claimed in claim 7, wherein the bolts (38) comprise, between their threads (46, 46'), an encircling beading (50) an axial end face of which forms the abutment (44).

* * * * *